United States Patent [19]

Yei

[11] Patent Number: 5,744,591
[45] Date of Patent: Apr. 28, 1998

[54] RED DYESTUFFS

[75] Inventor: Min-Mey Yei, Taoyuan, Taiwan

[73] Assignee: Everlight USA, Inc., Pineville, N.C.

[21] Appl. No.: 863,873

[22] Filed: May 27, 1997

[51] Int. Cl.[6] .................................................. C09B 31/08
[52] U.S. Cl. .................................... 534/836; 534/829
[58] Field of Search ......................... 534/829, 836, 534/819

[56] References Cited

U.S. PATENT DOCUMENTS

| | | | |
|---|---|---|---|
| 931,423 | 8/1909 | Hesse et al. | 534/829 |
| 1,602,776 | 10/1926 | Neelmeier et al. | 534/879 |
| 4,082,742 | 4/1978 | Eastlack | 534/836 X |

OTHER PUBLICATIONS

Colour Index, 3rd Edition, vol. 4, 1971, Society of Dyers and Colourists, C.I. 28160, C.I. 28410.

*Primary Examiner*—Fiona T. Powers
*Attorney, Agent, or Firm*—Fish & Richardson P.C.

[57] ABSTRACT

A dyestuff of the general formula (1),

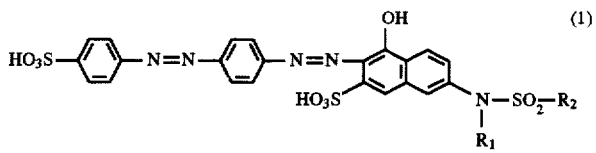

wherein $R_1$ is H or $C_1$–$C_4$ alkyl; $R_2$ is a phenyl or naphthyl group, which is unsubstituted or substituted by —Cl, —Br, —I, —$CH_3$, —$C_2H_5$, —$C_3H_7$, —$C_4H_9$, —OH, —$OCH_3$, —$OC_2H_5$, —$NO_2$, —$NHCOCH_3$ or —COOH. The dyestuff of the present invention is suitable for dyeing and printing of materials containing hydroxyl group or amide group, in particular animal fibrous material, synthetic polyamide and polyurethane fibers.

14 Claims, No Drawings

RED DYESTUFFS

FIELD OF THE INVENTION

The present invention relates to a novel red dyestuffs.

BACKGROUND OF THE INVENTION

Red or yellowish red dyestuffs are already known from U.S. Pat. Nos. 5,075,428, 5,359,042 and 5,354,849.

SUMMARY OF THE INVENTION

The present invention relates to a novel red dyestuffs of the general formula (1)

$$HO_3S-\text{Ar}-N=N-\text{Ar}-N=N-\text{Naph(OH)(HO}_3S)-N(R_1)-SO_2-R_2 \quad (1)$$

wherein:

$R_1$ is H or $C_1-C_4$ alkyl;

$R_2$ is a phenyl or naphthyl group, which is unsubstituted or substituted by —Cl, —Br, —I, —CH$_3$, —C$_2$H$_5$, —C$_3$H$_7$, —C$_4$H$_9$, —OH, —OCH$_3$, —OC$_2$H$_5$, —NO$_2$, —NHCOCH$_3$ or —COOH.

The dyestuff of formula (1) of the present invention is suitable for dyeing and printing of materials containing hydroxyl group or amide group, in particular animal fibrous material, synthetic polyamide and polyurethane fibers.

DESCRIPTION OF THE PREFERRED EMBODIMENTS

The dyestuff of formula (1) of the present invention can be synthesized by the following methods:

1. An amino hydroxynaphthalenesulphonic acid of the formula (2)

$$\text{Naph(OH)(HO}_3S)-NHR_1 \quad (2)$$

wherein $R_1$ has the same definition as the above, is first coupled with the diazotized amine of the formula (3).

$$HO_3S-\text{Ar}-N=N-\text{Ar}-NH_2 \quad (3)$$

The coupling component thus obtained of the formula (4), $$HO_3S-\text{Ar}-N=N-\text{Ar}-N=N-\text{Naph(OH)(HO}_3S)-NHR_1 \quad (4)$$

wherein $R_1$ has the same definition as the above, is reacted with a benzene of the formula (5) or a naphthalene of the formula (6), $$R_3-\text{C}_6H_4-SO_2Cl \quad (5) \qquad R_3-\text{Naph}-SO_2Cl \quad (6)$$

wherein $R_3$ is selected from —Cl, —Br, —I, —CH$_3$, —C$_2$H$_5$, —C$_3$H$_7$, —C$_4$H$_9$, —OH, —OCH$_3$, —OC$_2$H$_5$, —NO$_2$, —NHCOCH$_3$, and —COOH, to give a dyestuff of the formula (1).

2. An aminohydroxynaphthalenesulphonic acid of the formula (2) is first condensed with a benzene of the formula (5) or a naphthalene of the formula (6) and the resulting condensed compound of the formula (7) or (8), $$\text{Naph(OH)(HO}_3S)-N(R_1)-SO_2-\text{C}_6H_4-R_3 \quad (7)$$

$$\text{Naph(OH)(HO}_3S)-N(R_1)-SO_2-\text{Naph}-R_3 \quad (8)$$

wherein $R_1$ and $R_3$ have the same definition as the above, then is reacted with the diazotized amine of the formula (3) to give a dyestuff of the formula (1).

The coupling reaction of the compounds of the formula (2) with the formula (3) is carried out in aqueous solution or suspension at the temperature of 5° C. to 20° C., and at a weakly acidic or neutral to weakly alkaline pH. The acid (HX) thus eliminated is neutralized by the addition of aqueous alkali metal hydroxides, alkali metal carbonates or alkali metal bicarbonates, in general preferably trapped by sodium alkali, for example sodium carbonate.

The reaction of the reactant of the formula (4) with the formula (5) or (6) is preferably carried out in aqueous solution or suspension at the temperatures of 60° C. to 90° C., and at a weakly acidic to weakly alkaline pH.

The novel dyestuff of the formula (1) of the present invention is suitable for dyeing and printing of hydroxyl group or amide group containing material, in particular animal fibrous material, synthetic polyamide and polyurethane fibers.

The dyeing or printing processes are widely known by the people skilled in the art.

The formula of the water soluble dyestuffs in the description and in the examples are those of the free acid. The dyestuffs are in general isolated and used in the form of their alkali metal salts, in particular of the sodium salts, potassium salts or lithium salts.

EXAMPLE 1

1-Hydroxy-6-amino naphthalene-3-sulphonic acid (0.1 mole) was dissolved in 300 ml of water. The solution was warmed up to the temperature of 60° C. to 90° C., then 2-naphthalenesulfonyl chloride (45.3 g) was added, during which the liberated hydrochloric acid was neutralized by sodium carbonate solution. The resulting condensed compound was coupled with the diazo compound of 4-aminoazobenzen-4'-sulfonic acid (0.1 mole) at the temperature of 5° C. to 20° C. and the pH of 7.0 to 8.0. Upon completion of the coupling reaction, the dyestuff was precipitated by salting out with 20% by volume of sodium chloride. The precipitate was filtered, dried and milled to give a red dyestuff powder which was readily soluble in water, UV $\lambda_{max}$=515 nm. The free acid form structure of this dyestuff was shown as the formula (9).

warmed up to the temperature of 60° C. to 90° C., then p-toluenesulfonyl chloride (38.1 g) was added, during which the liberated hydrochloric acid was neutralized by sodium carbonate solution. The resulting condensed compound was coupled with the diazo compound of 4-aminoazobenzen-4'-sulfonic acid (0.1 mole) at the temperature of 5° C. to 20°

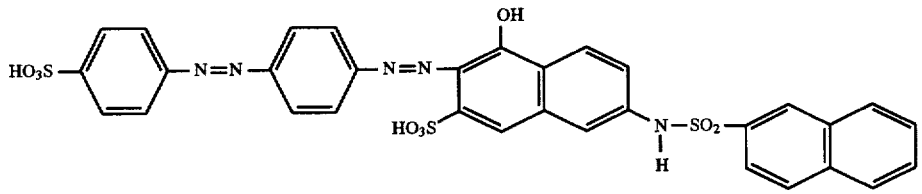

(9)

The dyestuff of the formula (9) was dissolved in water to give a yellowish red color solution. The dyestuff of the formula (9) was used to dye Nylon by a customary process. The dyed Nylon product was in a clear yellowish red shades of good wet fastness and light fastness properties.

EXAMPLES 2

1-Hydroxy-6-methylamino naphthalene-3-sulphonic acid (0.1 mole) was dissolved in 300 ml of water. The solution was warmed up to the temperature of 60° C. to 90° C., then 2-naphthalenesulfonyl chloride (45.3 g) was added, during which the liberated hydrochloric acid was neutralized by sodium carbonate solution. The resulting condensed compound was coupled with the diazo compound of 4-aminoazobenzen-4'-sulfonic acid (0.1 mole) at the temperature of 5° C. to 20° C. and the pH of 7.0 to 8.0. Upon completion of the coupling reaction, the dyestuff was precipitated by salting out with 20% by volume of sodium chloride. The precipitate was filtered, dried and milled to give a red dyestuff powder which was readily soluble in water, UV $\lambda_{max}$=516 nm. The free acid form structure of this dyestuff was shown as the formula (10).

C. and the pH of 7.0 to 8.0. Upon completion of the coupling reaction, the dyestuff was precipitated by salting out with 20% by volume of sodium chloride. The precipitate was filtered, dried and milled to give a red dyestuff powder which was readily soluble in water, UV $\lambda_{max}$=511 nm. The free acid form structure of this dyestuff was shown as the formula (11).

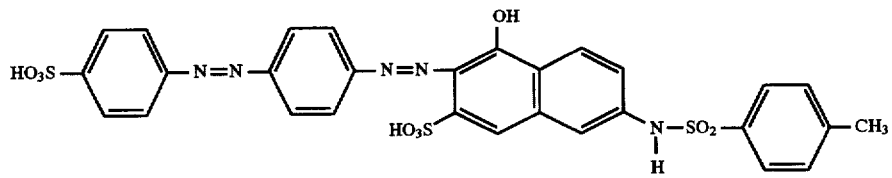

(11)

The dyestuff of the formula (11) was dissolved in water to give a yellowish red color solution. The dyestuff of the formula (11) was used to dye Nylon by a customary process. The dyed Nylon product was in a clear yellowish red shades of good wet fastness and light fastness properties.

EXAMPLES 4

1-Hydroxy-6-methylamino naphthalene-3-sulphonic acid (0.1 mole) was dissolved in 300 ml of water. The solution was warmed up to the temperature of 60° C. to 90° C., then p-toluenesulfonyl chloride (38.1 g) was added, during which the liberated hydrochloric acid was neutralized by sodium carbonate solution. The resulting condensed compound was

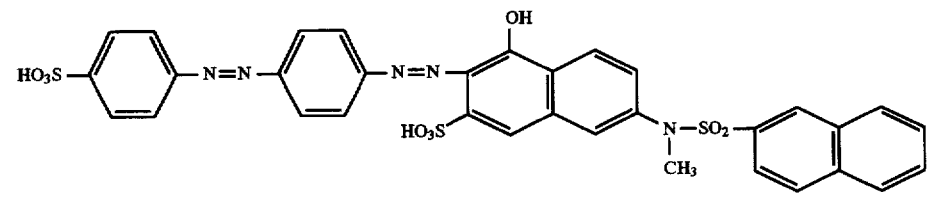

(10)

The dyestuff of the formula (10) was dissolved in water to give a yellowish red color solution. The dyestuff of the formula (10) was used to dye Nylon by a customary process. The dyed Nylon product was in a clear yellowish red shades of good wet fastness and light fastness properties.

EXAMPLES 3

1-Hydroxy-6-amino naphthalene-3-sulphonic acid (0.1 mole) was dissolved in 300 ml of water. The solution was coupled with the diazo compound of 4-aminoazobenzen-4'-sulfonic acid (0.1 mole) at the temperature of 5° C. to 20° C. and the pH of 7.0 to 8.0. Upon completion of the coupling reaction, the dyestuff was precipitated by salting out with 20% by volume of sodium chloride. The precipitate was filtered, dried and milled to give a red dyestuff powder which was readily soluble in water, UV $\lambda_{max}$=511.5 nm. The free acid form structure of this dyestuff was shown as the formula (12).

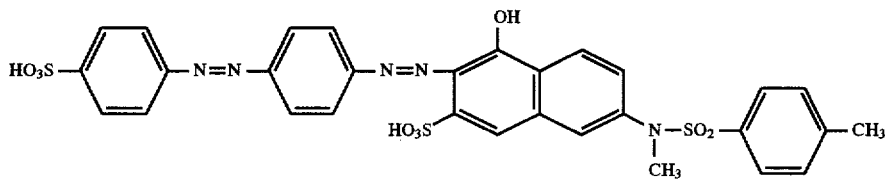

(12)

The dyestuff of the formula (12) was dissolved in water to give a yellowish red color solution. The dyestuff of the formula (12) was used to dye Nylon by a customary process. The dyed Nylon product was in a clear yellowish red shades of good wet fastness and light fastness properties.

EXAMPLES 5

1-Hydroxy-6-amino naphthalene-3-sulphonic acid (0.1 mole) was dissolved in 300 ml of water. The solution was warmed up to the temperature of 60° C. to 90° C., then p-benzenesulfonyl chloride (35.3 g) was added, during which the liberated hydrochloric acid was neutralized by sodium carbonate solution. The resulting condensed compound was coupled with the diazo compound of 4-aminoazobenzen-4'-sulfonic acid (0.1 mole) at the temperature of 5° C. to 20° C. and the pH of 7.0 to 8.0. Upon completion of the coupling reaction, the dyestuff was precipitated by salting out with 20% by volume of sodium chloride. The precipitate was filtered, dried and milled to give a red dyestuff powder which was readily soluble in water, UV $\lambda_{max}$=511 nm. The free acid form structure of this dyestuff was shown as the formula (13).

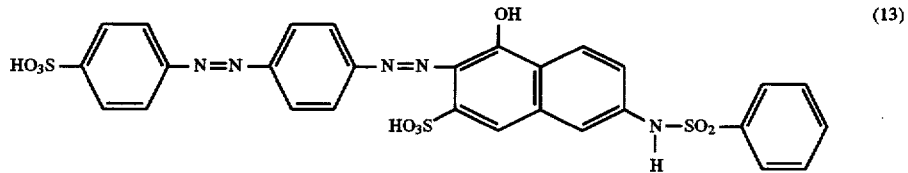

(13)

The dyestuff of the formula (13) was dissolved in water to give a yellowish red color solution. The dyestuff of the formula (13) was used to dye Nylon by a customary process. The dyed Nylon product was in a clear yellowish red shades of good wet fastness and light fastness properties.

EXAMPLES 6

1-Hydroxy-6-methylamino naphthalene-3-sulphonic acid (0.1 mole) was dissolved in 300 ml of water. The solution was warmed up to the temperature of 60° C. to 90° C., then p-benzenesulfonyl chloride (38.1 g) was added, during which the liberated hydrochloric acid was neutralized by sodium carbonate solution. The resulting condensed compound was coupled with the diazo compound of 4-aminoazobenzen-4'-sulfonic acid (0.1 mole) at the temperature of 5° C. to 20° C. and the pH of 7.0 to 8.0. Upon completion of the coupling reaction, the dyestuff was precipitated by salting out with 20% by volume of sodium chloride. The precipitate was filtered, dried and milled to give a red dyestuff powder which was readily soluble in water. UV $\lambda_{max}$=511.5 nm. The free acid form structure of this dyestuff was shown as the formula (14).

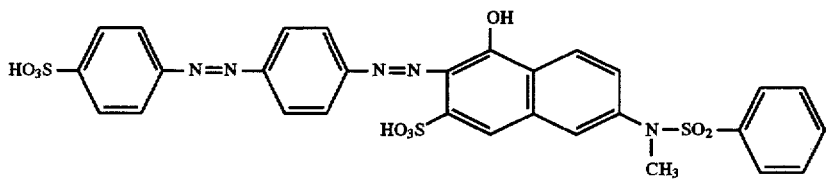

(14)

The dyestuff of the formula (14) was dissolved in water to give a yellowish red color solution. The dyestuff of the formula (14) was used to dye Nylon by a customary process. The dyed Nylon product was in a clear yellowish red shades of good wet fastness and light fastness properties.

What the invention claimed is:

1. A dyestuff of the formula (1):

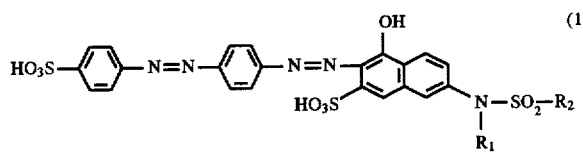

wherein:

$R_1$ is H or $C_1$–$C_4$ alkyl;

$R_2$ is a phenyl or naphthyl group, which is unsubstituted or substituted by —Cl, —Br, —I, —$CH_3$, —$C_2H_5$, —$C_3H_7$, —$C_4H_9$—OH, —$OCH_3$, —$OC_2H_5$, —$NO_2$, —$NHCOCH_3$ or —COOH.

2. A dyestuff according to claim 1, wherein $R_1$ is H or $CH_3$.

3. A dyestuff according to claim 1, wherein $R_2$ is a phenyl group, or a phenyl group substituted by —Cl, —Br, —I, —$CH_3$, —$C_2H_5$, —$C_3H_7$, —$C_4H_9$, —OH, —$OCH_3$, —$OC_2H_5$, —$NO_2$, —$NHCOCH_3$ or —COOH.

4. A dyestuff according to claim 1, wherein $R_2$ is a naphthyl group, or a naphthyl group substituted by —Cl, —Br, —I, —$CH_3$, —$C_2H_5$, —$C_3H_7$, —$C_4H_9$, —OH, —$OCH_3$, —$OC_2H_5$, —$NO_2$, —$NHCOCH_3$ or —COOH.

5. A dyestuff according to claim 2, wherein $R_2$ is a phenyl group, or a phenyl group substituted by —Cl, —Br, —I, —$CH_3$, —$C_2H_5$, —$C_3H_7$, —$C_4H_9$, —OH, —$OCH_3$, —$OC_2H_5$, —$NO_2$, —$NHCOCH_3$ or —COOH.

6. A dyestuff according to claim 2, wherein $R_2$ is a naphthyl group, or a naphthyl group substituted by —Cl, —Br, —I, —$CH_3$, —$C_2H_5$, —$C_3H_7$, —$C_4H_9$, —OH, —$OCH_3$, —$OC_2H_5$, —$NO_2$, —$NHCOCH_3$ or —COOH.

7. A dyestuff according to claim 1, wherein $R_1$ is H or $CH_3$, $R_2$ is a phenyl group, or a phenyl group substituted by —$CH_3$.

8. A dyestuff according to claim 1, wherein $R_1$ is H or $CH_3$, $R_2$ is a naphthyl group, or a naphthyl group substituted by —$CH_3$.

9. A dyestuff according to claim 1, wherein the dyestuff of the formula (1) is:

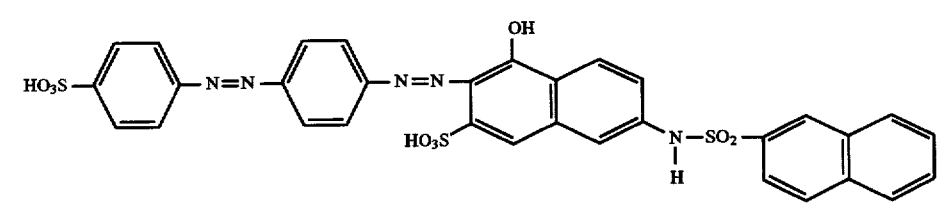

10. A dyestuff according to claim 1, wherein the dyestuff of the formula (1) is:

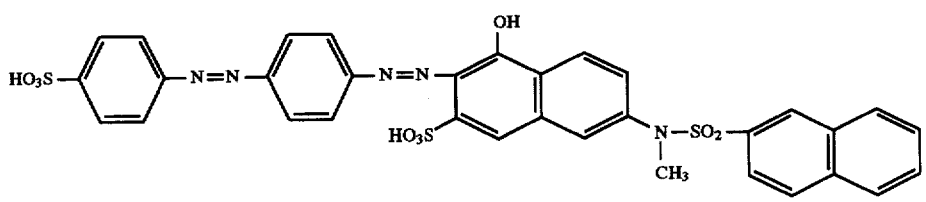

11. A dyestuff according to claim 1, wherein the dyestuff of the formula (1) is:

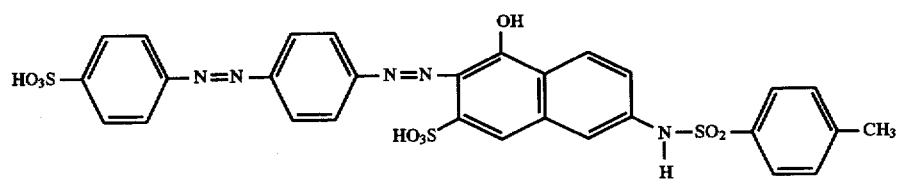

12. A dyestuff according to claim 1, wherein the dyestuff of the formula (1) is:
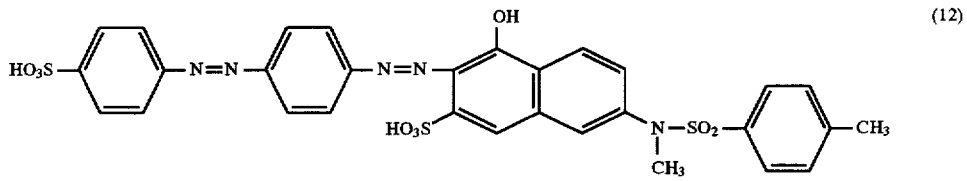
(12)
13. A dyestuff according to claim 1, wherein the dyestuff of the formula (1) is:
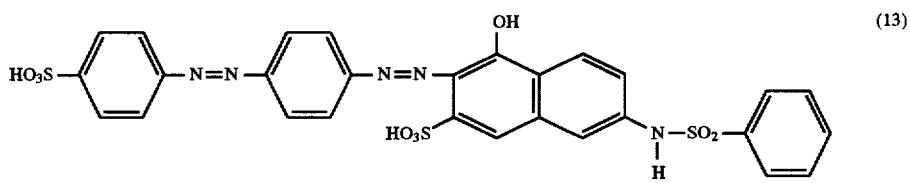
(13)
14. A dyestuff according to claim 1, wherein the dyestuff of the formula (1) is:
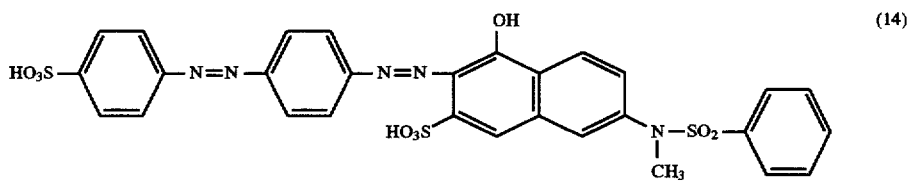
(14)
* * * * *